US006769902B2

(12) United States Patent
Hamann et al.

(10) Patent No.: US 6,769,902 B2
(45) Date of Patent: Aug. 3, 2004

(54) SURFACE-PRESSURE GENERATING DEVICE IN AN INJECTION-MOLDING MACHINE

(75) Inventors: Jens Hamann, Fuerth (DE); Elmar Schaefers, Nuremberg (DE)

(73) Assignee: Siemens Aktiengesellschaft (DE)

( * ) Notice: Subject to any disclaimer, the term of this patent is extended or adjusted under 35 U.S.C. 154(b) by 61 days.

(21) Appl. No.: 09/929,395

(22) Filed: Aug. 14, 2001

(65) Prior Publication Data

US 2002/0058083 A1 May 16, 2002

(30) Foreign Application Priority Data

Oct. 27, 2000 (DE) .......................................... 100 534 24

(51) Int. Cl.[7] .............................................. B29C 45/64
(52) U.S. Cl. .................................... 425/590; 425/451.2
(58) Field of Search ................................ 425/589, 590, 425/450.1, 457.2

(56) References Cited

U.S. PATENT DOCUMENTS 5,470,592 A * 11/1995 Steger ......................... 425/595
5,811,037 A *  9/1998 Ludwig ....................... 425/589

FOREIGN PATENT DOCUMENTS

| DE | 4336572 C2 |   | 12/1994 |
|----|------------|---|---------|
| DE | 19531131   | * |  2/1997 |
| DE | 19929626   |   | 11/2000 |
| JP | 62-3917    | * |  1/1987 |
| JP | 63-1516    | * |  1/1988 |
| JP | 5-293861   | * | 11/1993 |
| JP | 6-122136   | * |  5/1994 |
| JP | 10-12649   | * |  1/1998 |
| JP | 11-58468   | * |  3/1999 |

* cited by examiner

Primary Examiner—James P. Mackey
(74) Attorney, Agent, or Firm—Baker Botts L.L.P.

(57) ABSTRACT

In an injection-molding machine, the rapid traversing over long distances takes place with the aid of linear drives (L1, L2), the "rotor" (H1, H2) which is a component part of the machine construction.

2 Claims, 1 Drawing Sheet

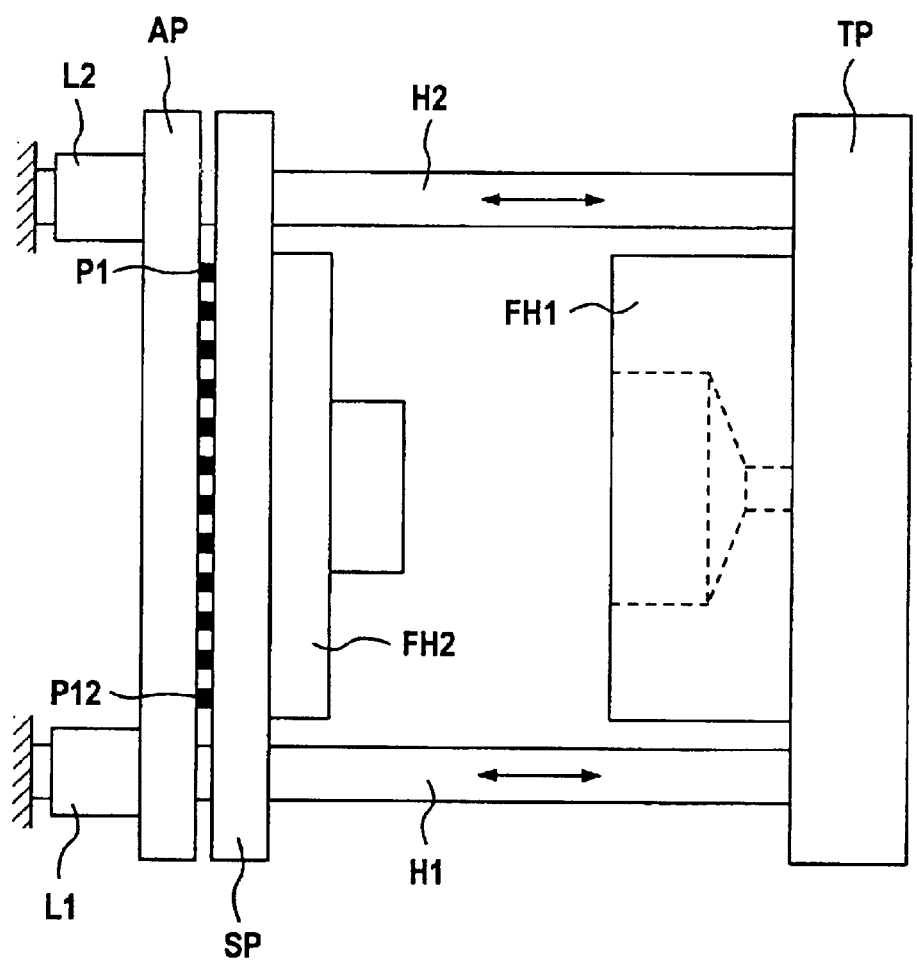

SURFACE-PRESSURE GENERATING DEVICE IN AN INJECTION-MOLDING MACHINE

FIELD OF THE INVENTION

The present invention relates to a surface-pressure generating device, for use particularly in an injection-molding machine, having a stationary platen, and a movable platen which can be moved linearly in relation to the stationary platen, guided by tie bars. Material to be compressed, or molds to be clamped are arranged between said moving platen and said stationary platen.

BACKGROUND OF THE INVENTION

Surface-pressure generation, in which a movable platen rests on a platen which can be arrested in an operating position, is generally disclosed in DE 43 36 572 C2. Here, the stationary platen and movable platen for an injection-molding machine are jointly moved relatively rapidly by a first traversing mechanism, then the stationary platen is arrested in the operating position. The injection-molding operation is started. To support the forces emanating from the flow front of the polymer, the movable platen is moved by a second traversing mechanism. While the first traversing mechanism is intended to bring about rapid movement over a relatively long path without strong force, a relatively high force is initiated by the second traversing mechanism over a short path. The first traversing mechanism is usually either a hydraulic drive or an electromotive drive, in which the rotary motion of the electric motor is converted into a linear motion by a gear mechanism. Although a hydraulic drive can initiate a linear motion relatively easily, it requires the use of special hydraulic fluids, which are not always desirable. Also, the use of a conventional electric motor means that the original rotational motion of the rotor first has to be converted into a linear motion.

SUMMARY OF THE INVENTION

The object of the present invention is to design a surface-pressure generating device in such a way that a rapid traversing mechanism is designed so as to be technically simple. This object is achieved in the present invention by arranging the primary part of a linear motor for the linear traversing on at least one of the tie bars; and with the secondary part of the motor being realized by the other tie bar. As a result, it is possible to realize a drive just by adding a primary part of a linear motor into the construction. The mechanisms are simply incorporated into the drive. The German text of the originally filed application is incorporated herein by reference.

It has been found to be advantageous if the linear motor is designed as an asynchronous motor, since there is no need for a special design of the tie bars, as would be necessary for synchronous operation. Moreover, the fact that the primary part of the linear motor is cylindrically engaged around the respective tie bar means that a high motor output can be achieved with a small volume.

DRAWINGS

A preferred embodiment of the present invention is described in more detail below in the context of the drawing, in which:

FIG. 1 illustrates the relevant elements of a plastics injection-molding machine, including the drive elements and in which the plastics injection-molding machine is shown in the moved-out state.

DETAILED DESCRIPTION OF THE INVENTION

In FIG. 1, two mold halves FH1 and FH2 are at a distance from each other, so that a finished molding, (not shown for the sake of overall clarity), can be removed from the machine. The mold half FH1 is fastened to a stationary platen TP. Tie bars, which are cylindrical steel rods, extend from each corner of the stationary platen. Only the tie bars H1 and H2 being visible in the representation. A stationary platen AP is moved relatively rapidly by four primary parts, when the primary parts are electrically activated. Only primary parts L1 and L2 are shown in the representation. Primary parts L1 and L2 are coil arrangements which act as a conventional stator on the tie bars H1 and H2 which act like a "rotor." Consequently, actuation of the primary parts L1 and L2 leads to a relatively rapid linear motion, depending on the direction of flow, indicated by double-headed arrows. The selection of the materials of the tie bars H1 and H2, and any structuring of the material of the tie bars to be performed according to the desired electrical properties, allow the interaction of the primary parts L1 and L2 with the tie bars H1 and H2 to be influenced according to said choice.

In conjunction with stationary platen AP, a co-movable platen SP is slidably arranged on tie bars H1 and H2. Piezoelectric actuators are arranged between the platen AP and the movable platen SP. Only actuators P1 to P12 are designated in FIG. 1.

When a workpiece is to be produced, the stationary platen AP and the movable platen SP are moved by the linear motors in such a way that the mold halves FH1 and FH2 come together. The stationary platen AP is then non-positively and/or positively locked in its position with respect to the tie bars H1 and H2 by auxiliary means which are not shown for the sake of overall clarity. The thermoplastic material is injected into the space between mold halves FH1 and FH2. However, to compensate for mechanical deformations of the overall system, the mold half FH2 must be braced against the flow pressure of the material to be injected. This takes place with the aid of the piezoelectric actuators which are electrically activated for this purpose.

According to the present invention, both traversing mechanisms are electrically triggered, so that it is possible to dispense entirely with the use of hydraulic elements. Furthermore, complicated gear elements are also not needed.

The principle of moving machine parts with the aid of linear motors in which the secondary part is a component part of the machine framework can be readily transferred also to devices other than surface-pressure generating devices.

We claim:

1. A surface-pressure generating device comprising:

a stationary plate;

a plurality of guiding tie bars fixed to said stationary plate;

a first movable plate having first guide openings for receiving said guiding tie bars to be movable along said guiding tie bars;

a second movable plate having second guide openings for receiving said guiding tie bars to be movable along said guiding tie bars;

a linear motor attached to said second movable plate for moving said second movable plate from and to said stationary plate;

a piezoelectric actuator arranged and fixed between said first and second moveable plate for moving said first movable plate in relation to said second movable plate towards said stationary plate.

2. The surface-pressure generating device according to claim 1, wherein the linear motor is an asynchronous motor.

* * * * *